May 5, 1942.   S. J. MURCEK   2,282,198
PHOTOELECTRIC DIFFERENTIAL ANALYZER
Filed July 13, 1939
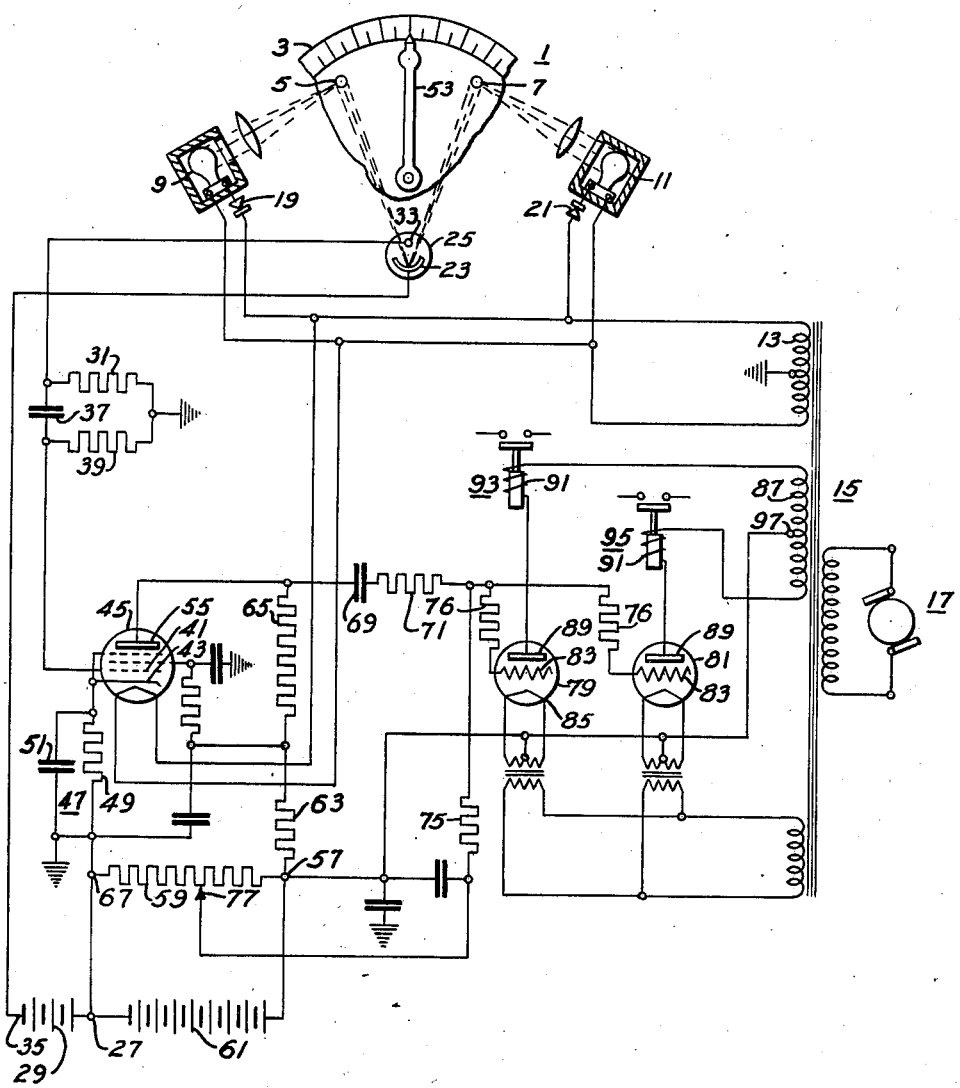
WITNESSES:
INVENTOR
Slavo J. Murcek.
BY
ATTORNEY

Patented May 5, 1942

2,282,198

UNITED STATES PATENT OFFICE 2,282,198

PHOTOELECTRIC DIFFERENTIAL ANALYZER

Slavo J. Murcek, Duquesne, Pa., assignor to Westinghouse Electric & Manufacturing Company, East Pittsburgh, Pa., a corporation of Pennsylvania Application July 13, 1939, Serial No. 284,147

6 Claims. (Cl. 250—41.5)

My invention relates to photosensitive apparatus and has particular relation to apparatus for comparing the optical properties of a plurality of regions.

The problem of comparing the color, luminosity, transparency, and other optical properties of two or more regions frequently arises in industry. For example, on numerous occasions it becomes necessary to maintain the water level in a steam boiler between two limits. In this case the light emitted by the gauge in two different positions may be compared and a suitable compensating arrangement operated. In the rolling mill industry, the relative position of cold rolls may be gauged by comparing the light emitted from two limiting positions of a micrometer or of an indicating gauge hand.

To carry out the comparison by comparing the excitation of separate photosensitive devices subjected to radiation emitted by the several regions has proved highly impractical. This procedure involves the difficulty of matching photosensitive devices and its use is circumscribed by the fact that the devices fail to maintain their initial properties. A more satisfactory procedure which is taught by the prior art is to use a single photosensitive device and to accomplish the comparison by properly timing the application of radiant energy to the device from the separate regions. In Patent 1,996,233 to W. A. Darrah, an arrangement of this type is disclosed. In this system a rotating screen of one type or another is used to separate the radiant energy received from the two sources. The use of a mechanical arrangement such as that disclosed by Darrah, has, however, a number of disadvantages. In many cases the selecting element must be operated continuously for long intervals at a time, and the parts wear excessively. The cost of the motor and the screen has moreover been found to be excessive.

It is, accordingly, an object of my invention to provide a simple and inexpensive system for comparing the optical properties of a plurality of regions.

Another object of my invention is to provide an arrangement, as far as possible devoid of moving parts, for comparing the optical properties of a plurality of regions.

An ancillary object of my invention is to provide a source of radiant energy particularly adapted for use in comparing the optical properties of two or more regions.

More concisely stated, it is an object of my invention to provide an arrangement of simple structure which shall be selectively responsive to the radiant energy emitted by two or more regions.

In accordance with my invention the radiant energy used in carrying out the comparison is derived from a plurality of emitters energized from an alternating current source. The number of emitters corresponds to the number of regions to be compared. Power is supplied to the emitters from the source in half-waves, displaced in phase to correspond to the number of emitters. For example, where only two emitters are used, they are supplied during alternate half-periods of the source. Where three emitters are used, they are supplied with half-waves displaced in phase by 120°. The power for more than two emitters, may be supplied from a polyphase source of electrical energy or a single phase source may be used and properly adjusted phase shifters may be interposed between the source and the emitters.

The emitters are preferably of the type that manifests an appreciable decrease in radiant intensity in an interval of time of the order of one half-period of the source if the power supply is discontinued. The radiation from each of the emitters is projected on the regions to be compared and a single photoelectric element such as a photoemissive cell, a photovoltaic cell, or a thermocouple is energized sequentially by the resultant radiation emitted from the regions to be compared. On occasions, it may be necessary to compare the intensity of the radiation of two emitters. In such a case, the photosensitive element is excited directly by the radiation of the two emitters. When I refer hereinafter to the resultant radiant energy emitted by regions being compared, the expression shall be taken to include within its scope the primary radiant energy of emitters, if the comparison happens to be made between such elements.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which the single figure is a diagrammatic view showing an embodiment of my invention.

In the drawing, my invention is shown as adapted to control a process in response to the position of a gauge 1. The gauge may be controlled from the steam pressure in a boiler or from a micrometer in a rolling mill. The dial face 3 of the gauge 1 has a reflecting surface, and a pair of radiant energy beams are projected on the surface at two points 5 and 7 corresponding to the limiting indications for which corrective operations are to take place.

The radiant energy is derived from a pair of emitters 9 and 11, each of which is preferably a lamp with an incandescible filament of tungsten or a similar material. The filament should be composed of thin gauge wire so that the lamp has a low heat retaining capacity and the intensity of radiant energy emitted thereby appreciably decreases within a half-period of the usual commercial 60-cycle source. The lamps 9 and 11 are energized from a secondary section 13 of a transformer 15 supplied from an alternating-current source 17, preferably of the commercial 60-cycle type, through separate half-wave rectifiers 19 and 21. The rectifiers 19 and 21 are interposed in the supply conductors to the lamps 9 and 11 in such manner that one lamp receives current during alternate half-periods of the source 17 and the other lamp receives current during the intervening half-periods. Since the lamp filaments are of low heat retaining capacity, the radiations emitted by the lamps 9 and 11 pulsate at a frequency of 60-cycles per second, but the pulsations are displaced in phase by 180°.

The combination of a lamp and a rectifier is used in accordance with the preferred practice of my invention because it is relatively inexpensive and convenient. However, there are other possibilities. The radiant energy emitters themselves may have rectifying properties. For example, emitters of the crater type such as are common in the talking motion picture art may be used. Such emitters may be directly connected to the secondary section 13 in such manner as to produce the dephased radiant energy. In the operation of the crater emitter, a lag in the emission is encountered and therefore, the energy supplied to the element should preferably be advanced in phase with reference to the source potential.

The radiant energy reflected from the limiting points 5 and 7 on the gauge dial 3 impinge on the photo-responsive element 23 of a single photosensitive device 25. As shown in the drawing, the device 25 is of the emissive type (an RCA 922 in actual practice) and the photo-responsive element 23 is its cathode. The parenthetical statements refer to the actual elements used in a system which is operated satisfactorily.

The radiation impinging on the cell 25, from both limiting points 5 and 7, is substantially uniform as the fluctuation from one of the sources is counteracted by that from the other. Substantially continuous current, therefore, flows through the cell 25 in a circuit extending from the grounded positive terminal 27 of a power source 29 such as a battery (80 volts), for example, through a high resistor 31 (7 megohms), the anode 33 and cathode 23 of the cell 25 to the negative terminal 35 of the source 29. A capacitor 37 (.01 microfarad) is connected in series with a second resistor 39 (4 megohms) across the high resistor 31 and the potential drop across the high resistor 31 causes a charge to accumulate on the capacitor. The resistor 39 in series with the capacitor 37 is connected between the control electrode 41 and the cathode 43 of a high vacuum thermionic tube 45, such as a pentode (RCA 57). The control circuit extends from the ground connection through the resistor 39, the control electrode 41, and the cathode 43 of the tube 45, a self-biasing network 47 consisting of a resistor 49 (2000 ohms) and a parallel connected condenser 51 (8 microfarads) to ground. Normally, the capacitor 37 connected to the high resistor 31 is maintained charged by the uniform current flow through the high resistor and the conductivity of the tube is maintained small by the potential supplied by the self-biasing network 47.

The gauge 1 is provided with an indicator 53 which moves in response to the variations produced by the process under observation. The indicating pointer preferably has a radiation-absorbing surface and when it reaches one of the limiting positions 5 or 7 (say 5), it absorbs the radiant energy from the corresponding emitter 9 or 11, (9). As a result, the current flow through the photoelectric cell 25 is materially decreased during the half-periods corresponding to the emitter (9) and the charged capacitor 37 discharges through the resistors 31 and 39 connected to it. During alternate half-periods of the source 17, therefore, an appreciable potential drop appears across the resistor 39 in the control circuit of the tube 45. Since the capacitor 37 is initially charged with its lower plate positive and its upper plate negative, the potential drop across the resistor 39 increases the positive potential of control electrode relative to ground. An impulse of current is therefore conducted between the anode 55 and the cathode 43 of the tube 45, in a circuit extending from the positive terminal 57 of a voltage divider 59 (25,000 ohms) connected across a source 61 of direct current (250 volts) which may be a battery through a pair of resistors 63 and 65 (5000 ohms and .5 megohm, respectively), the anode 55 and cathode 43 of the tube, the self biasing network 47 to the negative terminal 67 of the divider 59.

The series resistors 63 and 65 are connected in a network extending from the terminal of the resistor 65 which is connected to the anode 55 through another capacitor 69 (.01 microfarad), a plurality of additional resistors 71 and 75 (1000 ohms, and 7 megohms, respectively) to the adjustable tap 77 of the voltage divider 59. The potential drop across the series resistors 63 and 65 produces a current impulse in the network. The potential resulting from the impulse is impressed in the control circuits of a pair of arc-like discharge valves 79 and 81, (Westinghouse-WL 629).

The control electrodes 83 of the valves 79 and 81 are connected to the junction of the resistors 71 and 75 in the network through grid resistors 76 (3 megohms) and the cathodes 85 of the valves are connected to the positive terminal 57 of the voltage divider 59. Anode-cathode potential is supplied to both valves from mid-tapped secondary section 87 of the transformer 15. The anodes 89 of the valve are connected to the terminal taps of the section 87 through the exciting coils 91 of the relays 93 and 95, whereby the corrective operation is produced and the intermediate tap 97 is connected to the cathodes 85. In the absence of an impulse in the network of the capacitor 69, the valves 79 and 81 are maintained non-conductive by the biasing potential supplied between the adjustable tap 77 and the positive terminal 57 of the voltage divider 59. The charging impulse impresses a potential between the control electrodes 83 and the cathodes 85 of the valves which is sufficient to counteract the biasing potential. Since the anodes 89 of the valves are connected to opposite terminals of the secondary section 87, the anode-cathode potentials of the valves are of opposite polarity at all times, the anode-cathode potential of each valve being positive during alternate half-periods of the source. The variation in the anode-cathode potential of the valves 79 and 81 thus corresponds to the variation in the intensity of the radiant energy emitted by the lamps 9 and 11 and one of the valves (say 9) has a positive anode-cathode potential when the intensity of the corresponding lamp (say 9) is high and the other valve (81) has positive anode-cathode potential when the intensity of the other lamp (11) is high. When the radiation from one of the lamps (9) is absorbed by the indicator 53 an impulse counteracting the blocking bias is produced in the control circuit of the corresponding valve 79 when its anode-cathode potential is positive. That valve (79) is, therefore, rendered conductive and the corresponding relay (93) is energized to produce the required effect. The other valve (81) is not rendered conductive because its anode-cathode potential is negative when the counteracting impulses are impressed and positive only during the half-periods during which no impulses are present. Of course, if the pointer absorbs the radiant energy from the other lamp (11), the corresponding valve (81) is rendered conductive and the relay (95) is energized to produce the opposite corrective effect.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. For use in comparing the optical properties of at least two regions, the combination comprising means for supplying alternating-current power, a first means for projecting radiation on one of said regions, a second means for projecting radiations on the other of said regions, means for energizing said first radiation projecting means with selected half-waves of said power-supply means, means for energizing said second radiation projecting means with selected half-waves of said power-supply means which are displaced in phase with reference to said first-mentioned half-waves and means responsive to the resultant radiation emitted by said regions and operative in accordance with the optical properties of said regions, the last-mentioned means being energized at all times during the comparing operation by radiation from at least one of said regions.

2. For use in comparing the optical properties of at least two regions, the combination comprising means for supplying alternating-current power, a first means for projecting radiation on one of said regions, a second means for projecting radiation on the other of said regions, means for energizing said first radiation projecting means with selected half-waves of said power-supply means, means for energizing said second radiation projecting means with selected half-waves of said power-supply means which are displaced in phase with reference to said first-mentioned half-waves and means responsive to the resultant radiation emitted by said regions and operative in accordance with the optical properties of said regions, said responsive means comprising a single photosensitive device, means selectively responsive to the excitation of said device during the half-periods corresponding to said first-mentioned and said last-mentioned half-waves, respectively, and means for cutting off the radiation incident upon said photosensitive device from either said first means or said second means but incapable of simultaneously cutting off the radiation so incident from both said first and second means.

3. Apparatus according to claim 2 characterized by the fact that the selectively-responsive means includes a pair of electric discharge valves, one of which is supplied with positive anode-cathode potential during the half-periods corresponding to the first-mentioned half-waves and the other of which is supplied with positive anode-cathode potential during the half-periods corresponding to the last-mentioned half-waves.

4. Apparatus according to claim 2 characterized by the fact that the selectively-responsive means includes a pair of asymmetrically conductive valves having input and output circuits, the input circuits being supplied with potential in accordance with the excitation of the device and the respective output circuits being supplied in turn with potential conducive to the conduction of current during the half-periods corresponding to the first-mentioned and the last-mentioned half-waves, respectively.

5. Apparatus according to claim 1 characterized by the fact that the first means for projecting radiation includes a first incandescent lamp, the second means for projecting radiations includes a second incandescent lamp, the energizing means for the first radiation projecting means includes connections between the first lamp and the power-supply means in which a half-wave rectifier is interposed and the energizing means for the second radiation projecting means includes connections between the second lamp and the power-supply means in which a half-wave rectifier is interposed in such a way as to conduct current during the half-periods during which the first-mentioned rectifier is non-conductive.

6. Apparatus according to claim 1 characterized by the fact that the first means for projecting radiations includes a first lamp having an incandescible filament with so low a heat retaining capacity that its radiant intensity is perceptibly reduced within a half-period of the power-supply means, the second means for projecting radiations includes a second lamp having an incandescible filament with a heat retaining capacity similar to that of the filament of said first lamp, the energizing means for the first radiation projecting means includes connections between the first lamp and the power-supply means in which a half-wave rectifier is interposed and the energizing means for the second radiation projecting means includes connections between the second lamp and the power-supply means in which a half-wave rectifier is interposed in such a way as to conduct current during the half-periods during which the first-mentioned rectifier is non-conductive.

SLAVO J. MURCEK.